April 26, 1955  K. E. LUGOSCH  2,707,265
TESTING APPARATUS FOR VARIABLE RESISTANCE REGULATORS
Filed May 18, 1950  2 Sheets-Sheet 1

INVENTOR.
KARL EDWIN LUGOSCH
BY
ATTORNEY

April 26, 1955     K. E. LUGOSCH     2,707,265
TESTING APPARATUS FOR VARIABLE RESISTANCE REGULATORS
Filed May 18, 1950     2 Sheets-Sheet 2

INVENTOR.
*Karl Edwin Lugosch*
BY
*ATTORNEY*

United States Patent Office 2,707,265
Patented Apr. 26, 1955

2,707,265

TESTING APPARATUS FOR VARIABLE RESISTANCE REGULATORS

Karl Edwin Lugosch, Newtown, Pa., assignor to Bendix Aviation Corporation, Teterboro, N. J., a corporation of Delaware Application May 18, 1950, Serial No. 162,717

4 Claims. (Cl. 323—56)

The present invention relates to improvements in testing apparatus and more particularly to apparatus for testing regulators of the variable resistance type.

It is the usual practice to regulate output conditions of a generator such as the voltage and frequency by means of a variable resistance element such as a carbon pile in response to the output condition to be regulated. Heretofore, in order to test the regulator to ascertain its operating characteristics and to make the necessary adjustments, it has been necessary to use a generator of the type that the regulator is to be used with or one having similar ratings and characteristics.

An object of the present invention is to provide apparatus which will simulate both the voltage versus excitation current characteristics of the generator as well as the voltage versus speed characteristics.

A further object of the invention is to provide improved means for testing carbon pile regulators.

Another object is to provide means for adjusting carbon pile regulators.

Another object is to provide an improved test device.

Another object is to provide an easily reproducible standard device to be used for specification purposes independent of any particular generator characteristics. Thus, the regulator performance may be specified and tested on a universal comparison device.

Another object is to provide means for simulating the output conditions of a generator.

These and other objects and features of the invention will appear more fully hereinafter from a consideration of the following description taken in connection with the accompanying drawings wherein one embodiment of the invention is illustrated by way of example.

Figure 1:
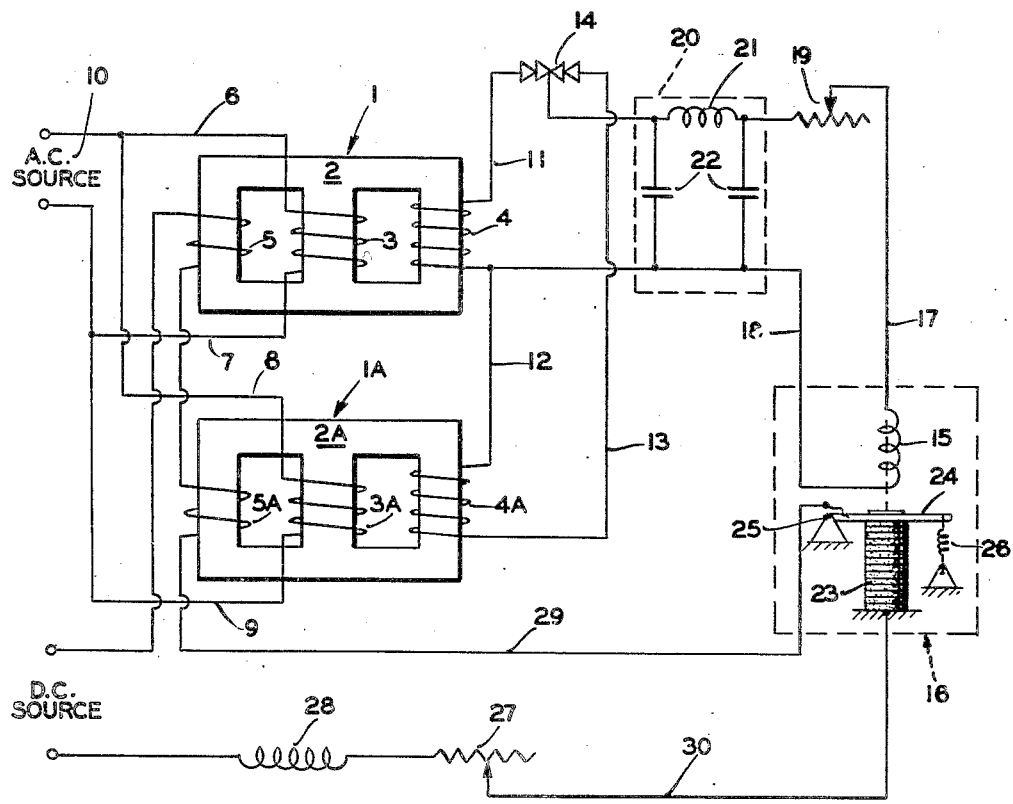
Figure 1 is a diagrammatic showing of a simplified system embodying the invention.

Referring to the drawings wherein like reference characters indicate like parts in the figures, there is shown in Figure 1, a pair of similar saturable transformers 1 and 1A having respective magnetizable cores 2 and 2A, each core having three parallel legs connected together at each end to form an integral core structure. Primary windings 3 and 3A are wound on the center leg of the respective cores 2 and 2A and secondary windings 4 and 4A are wound on one of the outside legs. The other outside leg carries the respective D. C. windings 5 and 5A.

The primary windings 3 and 3A are connected in parallel by conductors 6 and 7 and 8 and 9 respectively to the output of a source of variable alternating current indicated generally by the numeral 10. The change in impressed A. C. voltage simulates a change in speed and/or load of the generator to be represented.

The secondary windings 4 and 4A are connected in series by conductors 11, 12 and 13 to the input terminals of a rectifier 14. One end of a control winding 15 for a regulator indicated generally by the numeral 16 is connected by a conductor 17 to the output terminal of the rectifier 14. The other end of the winding 15 is connected by a conductor 18 to the conductor 12 between the windings 4 and 4A. A variable resistance 19 may be inserted in the conductor 17 to adjust the voltage across the winding 15. A filter 20 may be inserted between the output of the rectifier 14 and the winding 15. The filter 20 may comprise a choke coil 21 and capacitors 22.

The regulator 16 may include a carbon pile resistance element 23. The winding 15 is so arranged in the regulator 16 so as to control an armature 24 pivoted at 25 and exerting a compressive force upon the carbon pile 23 under tension of a spring 26. The spring 26 is arranged so as to balance the pull on the armature 24 by the winding 15 when energized by a voltage having a predetermined value.

The carbon pile 23 is connected in series with the windings 5 and 5A, resistor 27 and inductance 28 by conductors 29 and 30 across a source of D. C. (not shown).

In operation the output voltage of a generator is simulated by the voltage induced in the secondary windings 4 and 4A by the primary voltage impressed upon the windings 3 and 3A. The output voltage from the secondary windings is fed into the full wave rectifier 14 from which a D. C. current for energizing the winding 15 is obtained.

Simulated field current is provided by the external source of D. C. and the resistance 27 and inductance 28. This simulated current flows through the D. C. control windings 5 and 5A of the transformers 1 and 1A. The inductance 28 simulates the inductance of a field winding and the resistance 27, the resistance of the field winding.

The carbon pile 23 regulates the simulated field current in the following manner: For a predetermined D. C. voltage for the simulated field excitation, an A. C. voltage is selected to give the desired output voltage from the transformers 1 and 1A. Upon a change in input A. C. voltage (simulating a change of flux in the generator), for example is diminished, the output voltage of the transformers 1 and 1A will decrease thus decreasing the pull exerted by the winding 15 on the carbon pile 23. This allows the spring 26 to further compress the carbon pile 23 and decrease the resistance thereof. With decreased resistance of the carbon pile 23, the current in the simulated field circuit will increase. This increase in current flowing through the D. C. windings 5 and 5A of the transformers 1 and 1A will increase the saturation of the cores 2 and 2A forcing the A. C. flux of the center leg to be diverted toward the right-hand leg, thus causing an increase in the voltage induced in the secondary windings 4 and 4A by the primary windings 3 and 3A.

Figure 2:
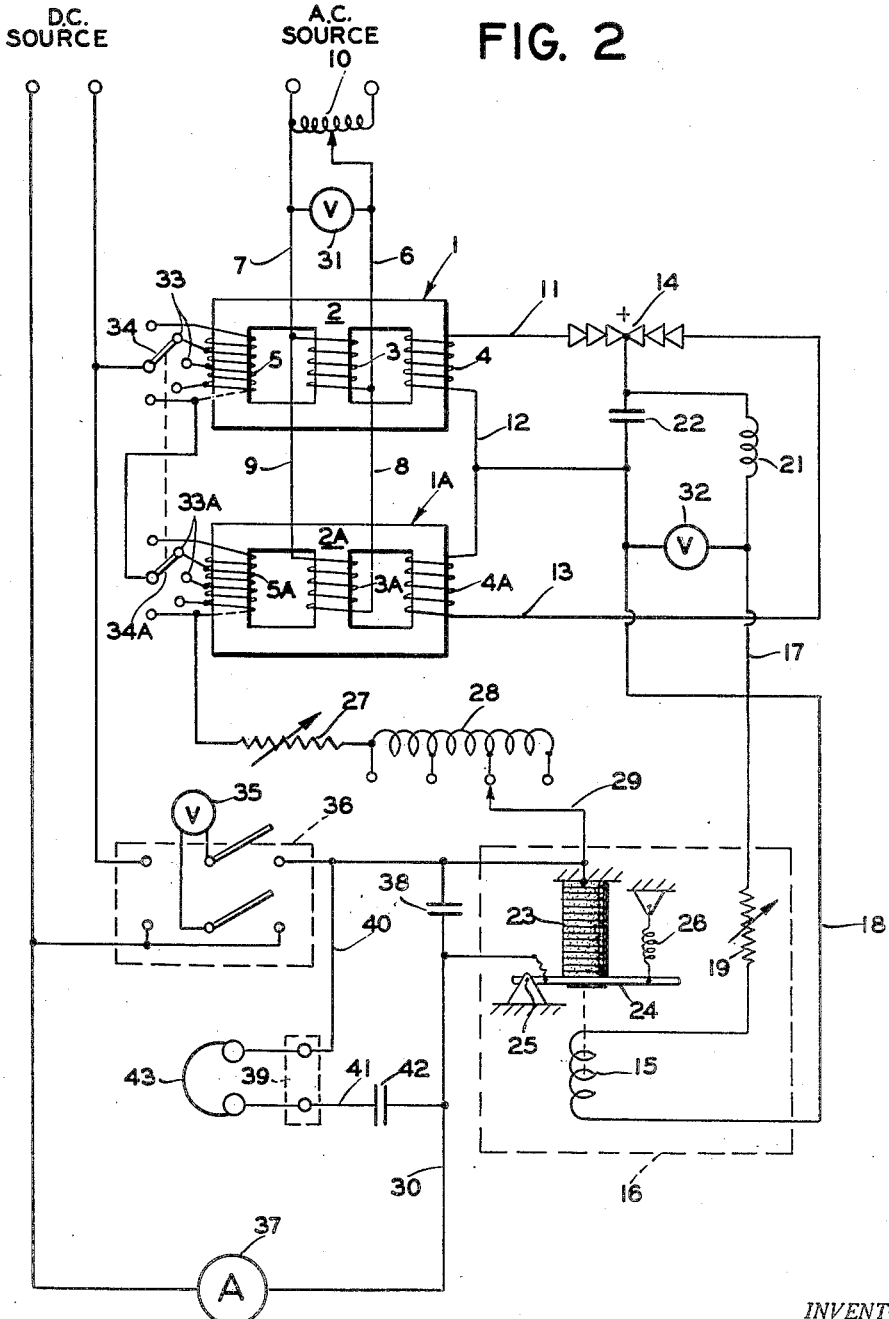
Figure 2 is a diagrammatic showing of a system embodying the invention.

Referring now to Figure 2, which is a modification of Figure 1 wherein like parts have been assigned the same reference numerals. The saturable transformers 1 and 1A as previously described have the primary windings 3 and 3A on the respective center legs of the saturable cores 2 and 2A. The primary windings 3 and 3A are connected across the output of an autotransformer 10. The autotransformer 10 may be energized from any suitable A. C. source (not shown). A suitable voltmeter 31 may be connected across the output of the autotransformer.

The secondary windings 4 and 4A are connected across the input terminals of the rectifier 14 and the control winding 15 connected across the output of the rectifier 14 as previously described. A suitable voltmeter 32 may be connected across the output of the rectifier 14.

In order that the transformers 1 and 1A may cover a wide range of values the D. C. windings 5 and 5A are provided with a plurality of taps 33 and 33A controlled by ganged switches 34 and 34A to change the number of turns of the windings 5 and 5A.

In order to simulate the field circuit conditions of generators of different ratings, the resistance 27 and the inductance 28 are adjustable to provide the desired values.

A suitable voltmeter 35 may be connected to a double throw double pole switch 36 connected so as to connect the voltmeter 35 across the D. C. input when in one position and across the carbon pile element 23 when in the other position. An ammeter 37 may be inserted in the conductor 30.

A capacitor 38 may be connected across the carbon pile 23 to reduce arcing between the disc of the carbon pile and also to help to represent the time constant of the generator field. A test jack 39 is connected by conductors 40 and 41 and capacitor 42 across the carbon pile 23 and various test equipment may be used therewith, for example, phones 43 as illustrated to listen to clicks caused by hunting of the regulator. However, other test equipment may be used such as an oscilloscope.

The operation is similar to that previously described for Figure 1. The meters 31, 32, 35 and 37 serve to indicate the conditions in the several portions of the circuit thus providing quick and accurate means for adjusting and testing variable resistance regulators.

Although only one embodiment of the invention has been illustrated and described, various changes in the form and relative arrangement of the parts, which will now appear to those skilled in the art, may be made without departing from the scope of the invention.

What is claimed is:

1. Apparatus for testing variable resistance regulators in which the characteristics of a dynamoelectric machine are simulated, comprising a pair of saturable transformers, each having a primary winding, a secondary winding and a direct current winding, an output circuit including rectifying means connected to said secondary windings, a direct current circuit including an inductance and resistance in series with a variable resistance to be tested, means responsive to a condition of said output circuit to effect said variable resistance in accordance with changes in said condition, and means including said direct current windings to effect said transformers in accordance with changes in said variable resistance to maintain said condition substantially constant.

2. Apparatus for testing variable resistance regulators in which the characteristics of a generator are simulated; comprising a pair of saturable transformers, each having a primary winding, a secondary winding and a direct current winding, a source of variable alternating current, means for connecting said primary windings in parallel across said alternating current, means for connecting said secondary windings in series, a source of direct current, a variable resistance element, means for connecting said direct current winding in series with said variable resistance element across said direct current source, and a control winding responsive to the voltage across said secondary winding to affect said resistance element to change the energization of said direct current windings thereby to change the ratio of said transformers.

3. Apparatus for testing variable resistance regulators in which the characteristics of a generator are simulated comprising a pair of saturable transformers, each having a primary winding, a secondary winding and a direct current winding, a source of variable alternating current, means for connecting said primary windings in parallel across said alternating current source, means for connecting said secondary windings in series, a source of direct current, a variable resistance element, an inductance and resistance in series, said inductance and resistance being proportioned to simulate the field inductance and resistance of a generator, means for connecting said direct current windings in series with said variable resistance element and said inductance and resistance across said direct current source, a control winding, means including a rectifier for connecting said control winding to said secondary windings to control said variable resistance element to vary the excitation of the direct current winding in response to changes in said alternating source.

4. Apparatus for testing carbon pile regulators in which the voltage versus excitation current characteristics of a generator are simulated, comprising a plurality of saturable transformers each having a primary winding, a secondary winding and a direct current winding, an alternating current source, means for connecting said primary windings in parallel to said alternating current source, means for connecting said secondary windings in series, a source of direct current, a carbon pile to be tested, means for connecting said carbon pile in series with said direct current windings to said direct current source, and a control winding responsive to the voltage across said secondary windings to affect said carbon pile to change the energization of said direct current windings thereby to maintain said voltage substantially independent of changes in said current sources.

References Cited in the file of this patent

UNITED STATES PATENTS

| | | |
|---|---|---|
| 1,943,464 | Von Ohlsen et al. | Jan. 16, 1934 |
| 2,227,468 | Sweeny | Jan. 7, 1941 |
| 2,346,997 | Priest | Apr. 18, 1944 |
| 2,423,114 | Potter | July 1, 1947 |
| 2,450,012 | Master et al. | Sept. 28, 1948 |
| 2,559,611 | Garmany, Jr. | July 10, 1951 |